United States Patent Office 3,560,532
Patented Feb. 2, 1971

3,560,532
3-SILYL-ETHER STEROIDS
Marco Cereghetti and Andor Furst, Basel, Max Vecchi, Reinach, and Walter Vetter, Munchenstein, Switzerland, assignors to Hoffmann-La Roche Inc., Nutley, N.J.
No Drawing. Filed Feb. 13, 1969, Ser. No. 799,113
Claims priority, application Switzerland, Feb. 23, 1968, 2,751/68
Int. Cl. C07c *169/34, 169/20*
U.S. Cl. 260—397.4           18 Claims

ABSTRACT OF THE DISCLOSURE 3-silyl-ether steroids of the androstane, pregnane, and corticoid series are prepared by reacting the corresponding 3-oxo-steroids with a silylating agent. End-products of the invention are useful as either anabolic, androgenic, progestational or corticoid agents depending upon the particular derivative prepared.

DETAILED DESCRIPTION OF THE INVENTION

This invention relates to novel 3-silyl-ether steroids and their method of preparation. More particularly this invention relates to silyl ether compounds of the following general formulas:

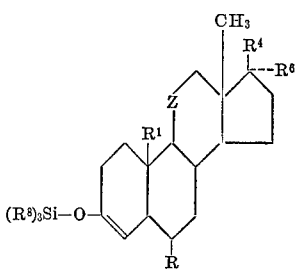

I wherein $R^4$ is —$OSi(R^8)_3$ or lower alkanoyloxy; $R^6$ is hydrogen, methyl, ethyl, vinyl or ethynyl; Z is methylene or Z'; Z' is carbonyl or —$CHOSi(R^8)_3$; $R^1$ is hydrogen or methyl; R is hydrogen, methyl or chlorine; and $R^8$ is lower alkyl;

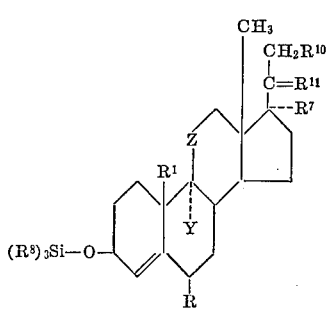

II wherein $R^{10}$ is hydrogen, lower alkanoyloxy or

—$OSi(R^8)_3$ $R^{11}$ is oxo (lower alkanoyloxy and hydrogen), or

[(—$OSi(R^8)_3$ and hydrogen)]

$R^7$ is lower alkanoyloxy, —$OSi(R^8)_3$, hydrogen, methyl, ethyl or vinyl; Y is hydrogen or fluorine; and Z, $R^1$ and $R^8$ are defined as above; and

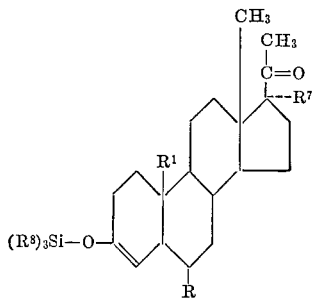

III wherein R, $R^1$, $R^7$ and $R^8$ are defined as above and to $\Delta^{5(6)}$ dehydro and $\Delta^{1,5(6)}$ bisdehydro derivatives thereof.

As used herein the terminology halogen comprehends all of the halogens, i.e., fluorine, chlorine, bromine and iodine. Lower alkyl comprehends both straight and branched chain saturated hydrocarbon moieties having up to 6 carbon atoms such as methyl, ethyl, t-butyl, isopropyl or the like with methyl being the preferred. Lower alkanoyl comprehends a residue of a lower alkane carboxylic acid containing up to 7 carbon atoms such as acetyl, propionyl, pivaloyl or the like.

Preferred compounds of the Formula I and subgeneric thereto are compounds represented by the formulas:

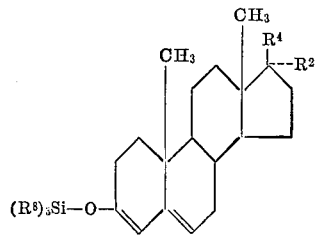

Ia wherein $R^2$ is hydrogen, methyl, ethyl or vinyl and $R^4$ is as defined as aforesaid; and

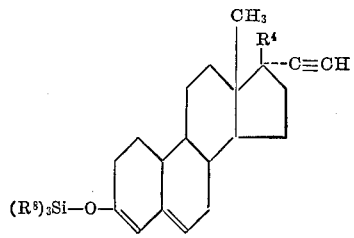

Ib wherein $R^4$ and $R^8$ are defined as aforesaid. Especially preferred are the compounds of Formula Ia wherein $R^4$ is —$OSi(R^8)_3$, wherein $R^8$ is defined as aforesaid. The compounds of Formula Ia are useful as anabolic or androgenic agents. The compounds of the Formula Ib are useful as progestational agents.

Preferred compounds of the Formula II and subgeneric thereto are compounds of the formula:

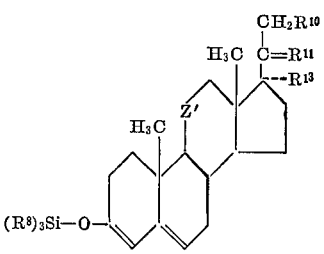

IIa wherein $R^{13}$ is lower alkanoyloxy or —$OSi(R^8)_3$ and Z', $R^8$, $R^{10}$, $R^{11}$ are defined as aforesaid. These compounds are useful as corticoid agents.

3

Preferred compounds of the Formula III and subgeneric thereto are compounds of the formula:

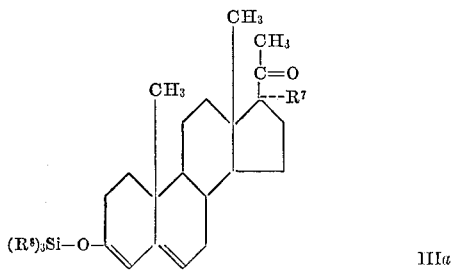

IIIa wherein R⁷ and R⁸ are defined as aforesaid. The compounds of Formula III are useful as progestational agents.

Exemplary compounds of Formulas I, II, and III obtainable by the process hereinafter described and exemplified are the following:

3-trimethylsilyloxy-17α-ethynyl-17β-acetoxy-19-norandrosta-3,5-diene;
3-trimethylsilyloxy-6-chloro-17α-methyl-17β-acetoxy-androsta-3,5-diene;
3,17β-bis-(trimethylsilyloxy)-androsta-3,5-diene;
3,17-bis-(trimethylsilyloxy)-17α-methyl-androsta-3,5-diene;
3,17β-bis-(trimethylsilyloxy)-17α-ethynyl-19-norandrosta-3,5-diene;
3-trimethylsilyloxy-17β-acetoxy-androsta-3,5-diene;
3,17β-bis-(triethylsilyloxy)-6-cholo-11-oxo-17α-methyl-androsta 3,5-diene;
3-trimethylsilyloxy-pregna-3,5-diene-20-one;
3,17β-bis-(tripropylsilyloxy)-19-norpregna-6-methyl-3,5-diene-20-one;
3,11β,17β-tri-(trimethylsilyloxy)-9-fluoro-17α-acetoxy-21-hydroxy-pregna-3,5-diene-20-one-21-acetate;
3-dimethylethylsilyloxy-17α-acetoxy-pregna-3,5-diene-20-one.

The novel 3-silyl ether compounds of the present invention can be prepared from their corresponding 3-oxo-precursors and Δ¹-dehydro and Δ¹,⁴ bisdehydro derivatives thereof by reacting therewith a tri-lower alkyl-silylating agent. It is critical to this invention in order to obtain the 3-silyloxy system that the starting reactant which is to be treated with the silylating agent have a free oxo group in the C–3 position. Further, it has been found that more than one silyl ether group can be introduced into the steroid nucleus by having free hydroxy groups present in certain positions of the steroid starting reactant. Hydroxy groups can be present at C–11 and C–17, C–20 and C–21 steroid positions, thus enabling the preparation of silyl ether derivatives at these positions.

The 3-oxo-steroid starting materials employed to prepare the products represented by Formulas I, Ia, Ib, II, IIa, III and IIIa have been previously described in the patents and/or in the literature. Thus, the starting materials which can be employed to prepare the androstanes of Formula I can be represented by the formula:

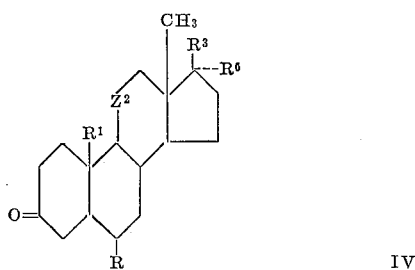

IV wherein R³ represents lower alkanoyloxy or hydroxy; Z² is Z or —CHOH; R, R¹, R⁶ and R⁸ are as defined aforesaid.

4

The starting materials which can be employed to prepare the corticoids of Formula II are represented by the formula:

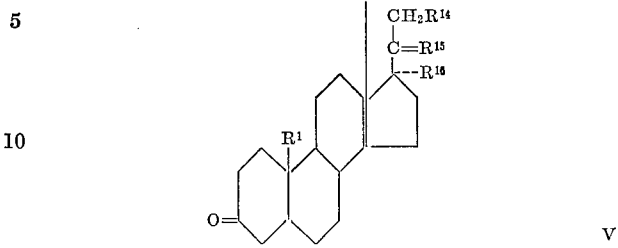

V wherein R¹⁴ is hydrogen, lower alkanoyloxy of hydroxy; R¹⁵ is oxo, (lower alkanoyloxy and hydrogen) or (hydrogen and hydroxy); R¹⁶ is lower alkanoyloxy, hydroxy, hydrogen, methyl, ethyl or vinyl; Z² is Z or —CHOH and Y, R, R¹ and R⁸ are defined as aforesaid.

The starting materials which can be employed to prepare the pregnanes of Formula III are represented by the formula:

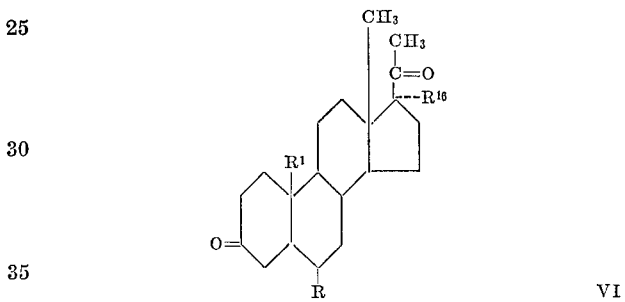

VI wherein R, R¹, R⁸ and R¹⁶ are defined as aforesaid.

The Δ⁵⁽⁶⁾ dehydro derivatives of the compounds of Formulae I, II and III above can be prepared from the Δ⁴ dehydro derivatives of the compounds of Formulae IV, V and VI. The Δ¹,⁵⁽⁶⁾ bisdehydro derivatives of the compounds of Formulae I, II and III can be prepared from the Δ¹,⁴ bisdehydro derivatives of the compounds of Formulae IV, V and VI.

The term lower trialkyl silylating agent denotes any compound capable of producing the —Si—(R⁸)₃ radical, wherein R⁸ is defined as aforesaid. Among the silylating agents which are suitable for this purpose are lower trialkyl halogen silanes, lower hexaalkyl disilazane, bis-(lower trialkyl silyl)acetamide or mixtures thereof. Each of the alkyl groups in the above silylating reagents is independent of the other alkyl groups in the reagent. That is to say the alkyl groups may be identical with each other different from each other. Thus, suitable substituted lower trialkyl reagents include trimethylfluorosilane, trimethylchlorosilane, triethylbromosilane, tri - (n-propyl)iodosilane, diethylmethylbromosilane, hexamethyl - disilazane, hexabutyl-disilazane, bis-(trimethylsilyl)acetamide, bis-(triethylsilyl)acetamide or the like.

The conversion to the silylated steroids is carried out with heating, preferably at the reflux temperature of the solvent. However, the temperature range is not critical and simply represents the most convenient method of carrying out the reaction in a minimum of time without undue difficulty. Reaction temperatures lower than reflux temperature can be employed with a concomitant increase in reaction time.

The solvent employed to conduct the conversion to the 3,5-diene silyl ether steroids must be anhydrous and inert to the reactants. Suitable anhydrous organic solvents include hydrocarbons, such as, benzene or toluene; chlorinated hydrocarbons, such as, chloroform or carbon tetrachloride; ketones, such as, acetone; N,N-di-lower alkyl-lower alkanoyl-amides, such as, dimethylformamide; or pyridine. The amount of solvent used is not critical, it being only necessary to use sufficient solvent to provide a reaction medium for the reactants. The reaction is preferably carried out under an inert atmosphere, such as nitrogen to the exclusion of any external moisture. The reaction is carried out in the presence of base, i.e., proton acceptor. Conveniently, the proton acceptor can also serve as a solvent for the steroidal starting material. Alternatively, the reaction medium can contain other inert organic solvents.

The required reaction time varies depending upon the type of starting steroidal reactant. However, the desired reaction time can be readily determined for the individual case by analysis of the reaction medium by means known to the art, e.g., gas chromatography.

The compounds of this invention are characterized by a high degree of endocrinological usefulness. The compounds represented by the Formula I their $\Delta^{5(6)}$ dehydro and $\Delta^{1,5(6)}$ bisdehydro derivatives exhibit anabolic and androgenic activity. The compounds of Formula II their $\Delta^{5(6)}$ dehydro and $\Delta^{1,5(6)}$ bisdehydro derivatives possess properties associated with corticoid agents. The compounds represented by the Formula III their $\Delta^{5(6)}$ dehydro and $\Delta^{1,5(6)}$ bisdehydro derivatives are useful as progestational agents. It has also been found that the compounds represented by the Formulas I, II and III as well as their $\Delta^{5(6)}$ dehydro and $\Delta^{1,5(6)}$ bisdehydro derivatives have a depot effect. Thus, the silylated steroids of this invention have demonstrated a sustained and delayed hormonal activity. The endocrinologically useful compounds of this invention can be administered internally, for example, orally or parenterally with dosage adjusted to individual requirements in the form of acceptable pharmaceutical preparations. For example, they can be administered in conventional solid or liquid forms, such as, tablets, pills, suppositories, capsules; in semi-solid form, e.g., as ointments or in liquid form, e.g., suspensions or emulsions. These pharmaceutical preparations can contain conventional pharmaceutical carriers and excipients such as water, talc, corn starch, polyalkylene glycols, emulsifying agents, agents for the adjustment of osmotic pressure, Vaseline or the like. Also, the pharmaceutical compositions of this invention can contain other active ingredients.

The following examples are illustrative of this invention but not limitative thereof. All temperatures in the examples are stated in °C.

Example 1

A mixture of 6 g. testosterone, 60 ml. hexamethyldisilazane, 20 ml. trimethylchlorosilane and 100 ml. pyridine are refluxed for 23 hours with the exclusion of moisture. The reaction mixture is then poured on ice water and taken up in ether. The ether solution is washed with cool water, dried over sodium sulfate and evaporated. The obtained product is chromatographed on silica gel. Elution with benzene yields 3,17β-bis(trimethylsilyloxy)-androsta-3,5-diene; M.P. 100–103° (from hexane).

Example 2

A mixture of 6 g. progesterone, 40 ml. hexamethyldisilazane, 10 ml. trimethylfluorosilane and 80 ml. pyridine is refluxed for 22 hours under nitrogen with the exclusion of moisture. The reaction mixture is evaporated to dryness at 40–50° under vacuum and the residue is chromatographed on silica gel. Elution with benzene and acetone (95:5) and benzene and acetone (9:1) yields 3-trimethylsilyloxy-pregna-3,5-diene-20-one; M.P. 110–112.5° (from acetone-ether-petroleum ether).

Example 3

A mixture of 300 mg. 17α-ethynyl-17β-hydroxy-19-nor-androst-4-en-3-one, 2.1 ml. hexamethyldisilazane, 0.5 ml. trichloro silane, and 5 ml. pyridine is agitated for 86 hours at room temperature with the exclusion of moisture. The reaction mixture is evaporated to dryness at 25–30° under vacuum (rotating evaporator). The working up of the residue in a similar manner to that employed in Example 2, yields 3,17β - bis(trimethylsiloxy)-17α-ethynyl-19-nor-androsta-3,5-diene; M.P.: 174–175°.

Example 4

A mixture of 149 mg. 17α-ethynyl-17β-hydroxy-19-nor-androst-4-en-3-one, 1000 mg. bis-(trimethylsilyl)acetamide, 200 mg. trimethylchlorosilane and 2 ml. dimethylformamide are heated for 3 hours at 80° under a nitrogen atmosphere, with the exclusion of moisture. The working up of the reaction mixture in a similar manner to that employed in Example 2, yields 3,17β-bis-(trimethylsilyloxy)-17α-ethynyl-19-nor-androsta-3,5-diene, which is identical with the product obtained in Example 3.

Example 5

A mixture of 5 g. 17α-methyl-17β-hydroxy-androst-4-en-3-one, 33.6 g. bis-(trimethylsilyl)acetamide, 6.5 ml. trimethylchlorosilane and 40 ml. pyridine were heated for 32 hours at 80° under nitrogen, with the exclusion of moisture. The reaction mixture is evaporated to dryness from toluene at 40° under vacuum in a film-type evaporator. The crystalline residue, 3,17β-bis(trimethylsilyloxy)-17α-methyl-androsta-3,5-diene, was recrystallized from hexane; M.P.: 132–134°.

Example 6

The 3-trimethylsilyloxy-17β-acetoxy-androsta-3,5-diene was obtained from testosterone-acetate following procedures employed in Example 3. Melting point: 132–134° (from ether-petroleum ether).

Example 7

The 3-trimethylsilyloxy-17α-ethynyl-17β-acetoxy-19-nor-androsta-3,5-diene is obtained from 17α-ethynyl-17β-acetoxy-19-nor-androst-4-en-3-one, analogously following procedures employed in Example 3. Melting point: 146–147° (from ether-petroleum ether).

Example 8

3,17β-bis(trimethylsilyloxy)-androsta-1,3,5(6)-triene of melting point 102–105° is obtained from 17β-hydroxy-androsta-1,4-dien-3-one in analogy to Example 3.

Example 9

3,17β-bis(trimethylsilyloxy)-5α-androst-3-ene of melting point 93–94.5° is obtained from 17β-hydroxy-5α-androstan-3-one in analogy to Example 3.

We claim:
1. A compound of the formula

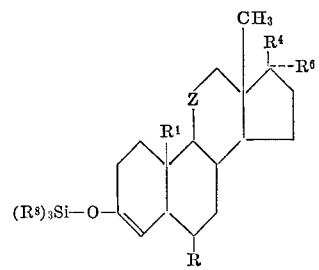

wherein $R^4$ is —OSi$(R^8)_3$ or lower alkanoyloxy; $R^6$ is hydrogen, methyl, ethyl, vinyl or ethynyl; Z is methylene or Z'; Z' is carbonyl or —CHOSi$(R^8)_3$; $R^1$ is hydrogen or methyl; R is hydrogen, methyl or chlorine; and $R^8$ is lower alkyl and $\Delta^{5(6)}$ dehydro and $\Delta^{1,5(6)}$ bisdehydro derivatives thereof.

2. A compound of the formula

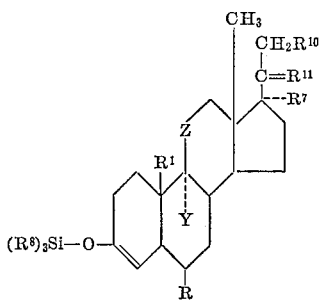

wherein $R^{10}$ is hydrogen, lower alkanoyloxy or —OSi($R^8$)$_3$; $R^{11}$ is oxo (lower alkanoyloxy and hydrogen) or [(—OSi($R^8$)$_3$ and hydrogen)]; $R^7$ is lower alkanoyloxy, —OSi($R^8$)$_3$, hydrogen, methyl, ethyl or vinyl; Y is hydrogen or fluorine; and Z is methylene or Z'; Z' is carbonyl or —CHOSi($R^8$)$_3$; $R^1$ is hydrogen or methyl; and $R^8$ is lower alkyl and $\Delta^{5(6)}$ dehydro and $\Delta^{1,5(6)}$ bisdehydro derivatives thereof.

3. A compound of the formula

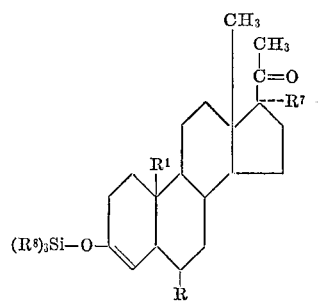

wherein R is hydrogen, methyl or chlorine; $R^1$ is hydrogen or methyl; $R^7$ is lower alkanoyloxy, —OSi($R^8$)$_3$, hydrogen, methyl, ethyl or vinyl; and $R^8$ is lower alkyl and $\Delta^{5(6)}$ dehydro and $\Delta^{1,5(6)}$ bisdehydro derivatives thereof.

4. A compound as in claim 1 of the formula:

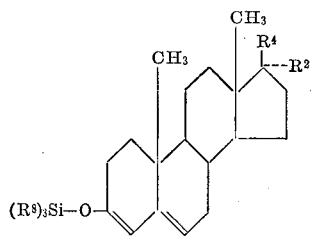

wherein $R^2$ is hydrogen, methyl, ethyl or vinyl and $R^4$ is as defined as aforesaid.

5. A compound as in claim 1 of the formula:

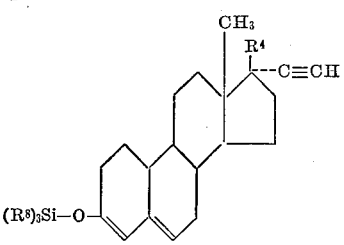

wherein $R^4$ and $R^8$ are defined as aforesaid.

6. A compound as in claim 2 of the formula:

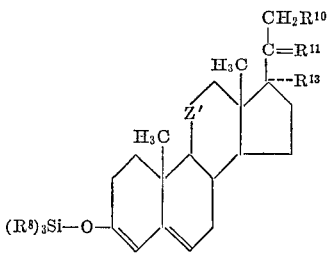

wherein $R^{13}$ is lower alkanoyloxy or —OSi($R^8$)$_3$ and Z', $R^8$, $R^{10}$, $R^{11}$ are defined as aforesaid.

7. A compound as in claim 3 of the formula:

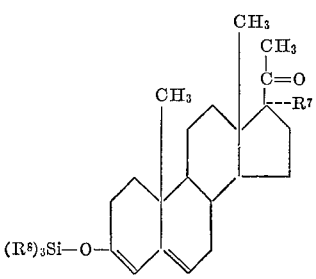

wherein $R^7$ and $R^8$ are defined as aforesaid.

8. A compound as in claim 1 wherein $R^1$ is methyl; R is hydrogen; Z is methylene; $R^6$ is hydrogen; $R^4$ is —OSi($R^8$)$_3$ and $R^8$ is as defined therein.

9. A compound as in claim 2 wherein R is hydrogen; Y is hydrogen; $R^1$ is methyl; Z is carbonyl; $R^7$ is lower alkanoyloxy, hydrogen or —OSi($R^8$)$_3$; $R^{11}$ is oxo; $R^{10}$ is lower alkanoyloxy and $R^8$ is as defined therein.

10. A compound as in claim 3 wherein R is hydrogen; $R^1$ is methyl; $R^7$ is lower alkanoyloxy or —OSi($R^8$)$_3$ and $R^8$ is as defined therein.

11. A compound as in claim 1 which is 3-17β-bis-(trimethylsilyloxy)androsta-3,5-diene.

12. A compound as in claim 1 which is 3,17β-bis-(trimethylsilyloxy)-17α-methyl-androsta-3,5-diene.

13. A compound as in claim 3 which is 3-trimethylsilyloxypregna-3,5-dien-20-one.

14. A compound as in claim 1 which is 3,17β-bis-(trimethylsilyloxy)-17α-ethynyl-19-norandrosta-3,5-diene.

15. A compound as in claim 1 which is 3-trimethylsilyloxy-17β-acetoxy-androsta-3,5-diene.

16. A compound as in claim 1 which is 3-trimethylsilyloxy-17α-ethynyl-17β-acetoxy-androsta-3,5-diene.

17. A compound as in claim 1 which is 3,17β-bis-(trimethylsilyloxy)-androsta-1,3,5(6)-triene.

18. A compound as in claim 1 which is 3,17β-bis-(trimethylsilyloxy)-5α-androst-3-ene.

No references cited.

HENRY A. FRENCH, Primary Examiner

U.S. Cl. X.R.

260—397.45, 397.47, 397.5, 999